Patented Oct. 30, 1951

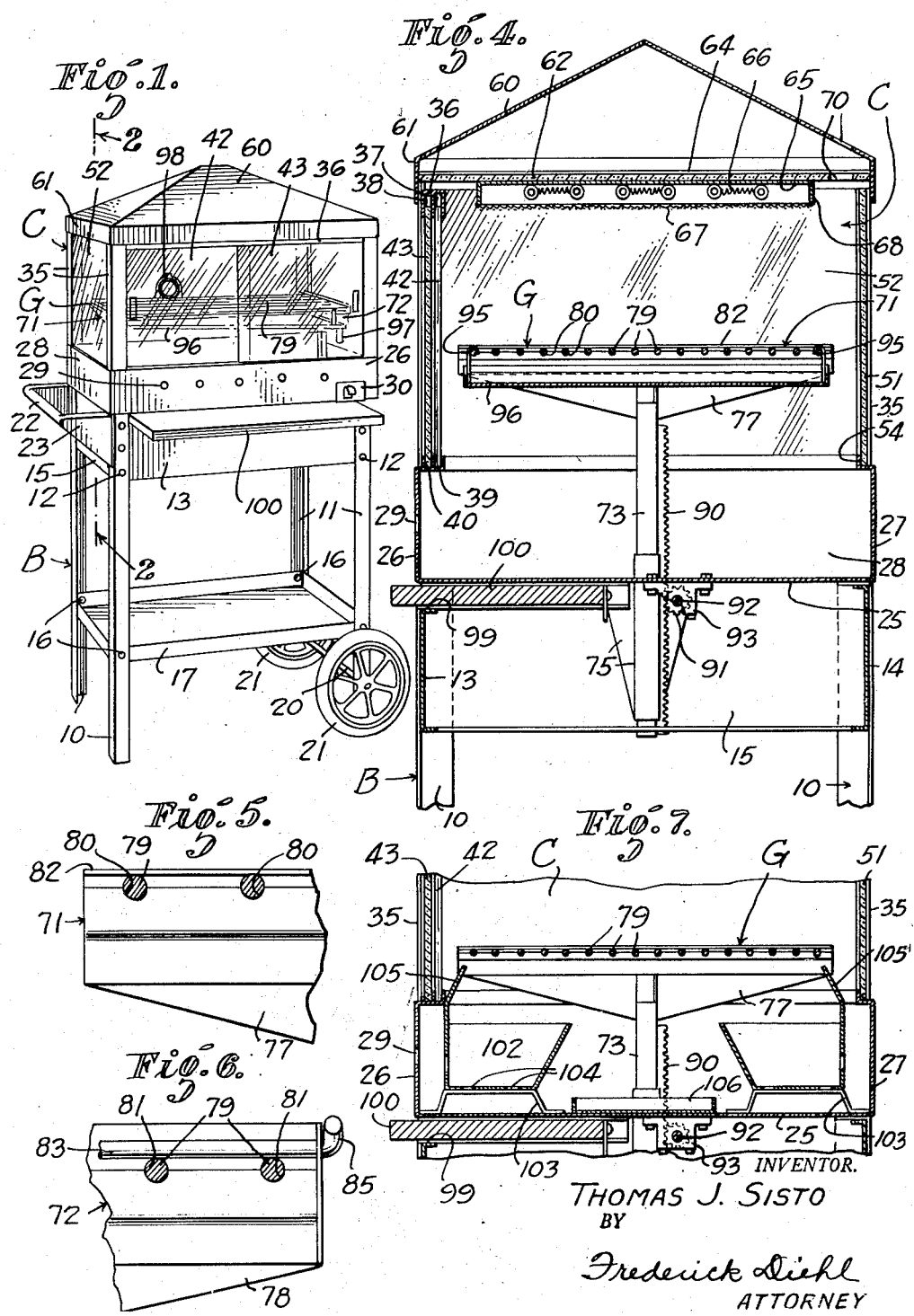

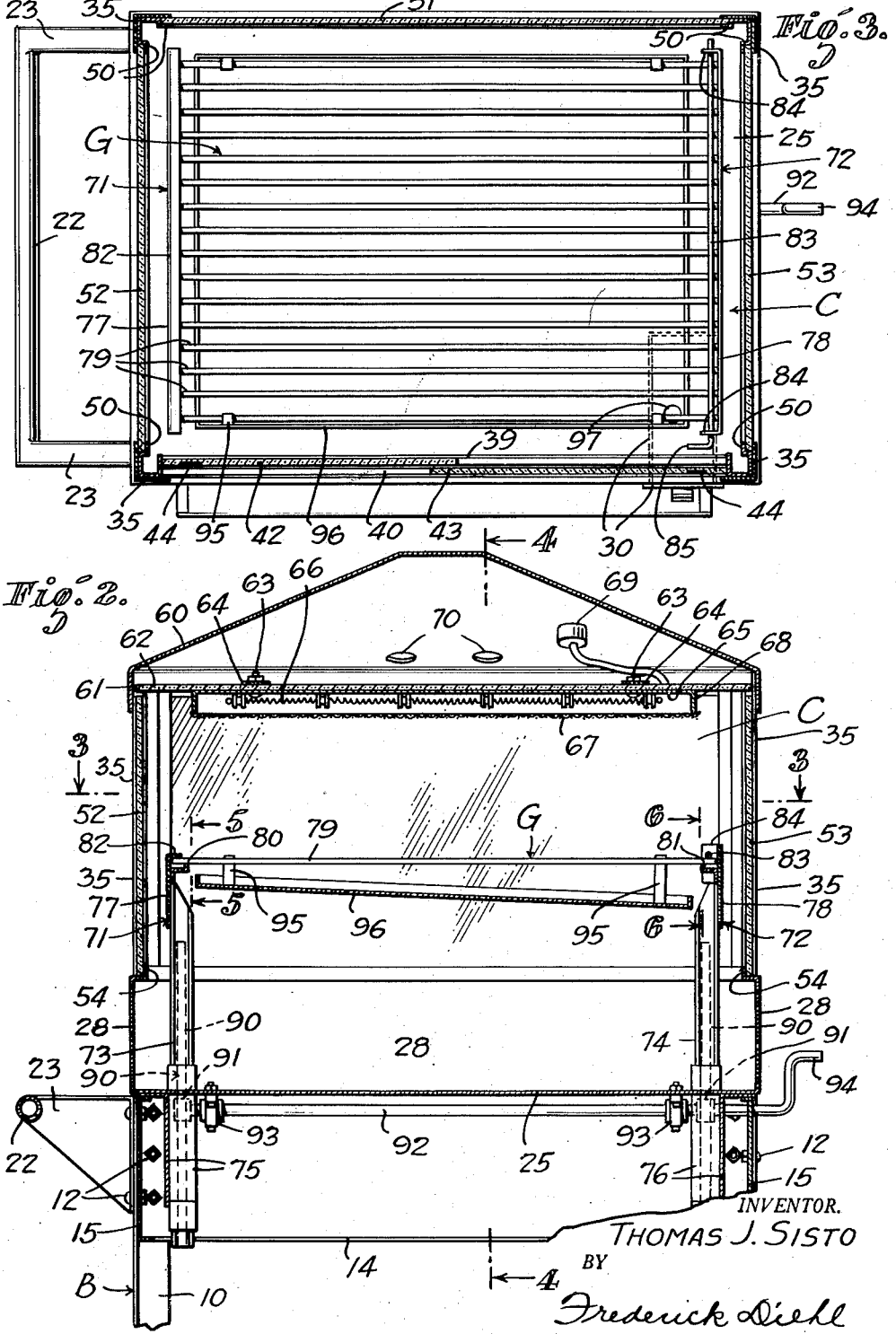

2,573,115

UNITED STATES PATENT OFFICE 2,573,115

BARBECUE STOVE

Thomas J. Sisto, Alhambra, Calif.

Application July 5, 1949, Serial No. 103,015

3 Claims. (Cl. 99—450)

An object of my invention is to provide a barbecue stove which is structurally characterized to enable foods to be perfectly barbecued, baked, broiled, toasted or roasted in a clean, sanitary manner without any smoke, soot, dust or dirt to contaminate the product or the surroundings; and which preferably embodies a transparent-walled cooking chamber conveniently accessible to apply, remove or baste the food on an adjustable grill or grate which can readily be adjusted from exteriorly of the cooking chamber to dispose the food being cooked, at the most thermally efficient location in the chamber.

It is another object of my invention to provide a barbecue stove which is structurally characterized by its portability, ease of assembling and of disassembling for thorough cleaning of all its parts, as well as for storage and shipping purposes.

It is a further object of my invention to provide a barbecue stove embodying a grate or grill, the food-supporting bars or rods of which can readily be removed in order that they may be thoroughly cleaned individually.

It is still another object of my invention to provide a barbecue stove which can be operated by electric current from a domestic source delivered to a heating element in the cooking chamber, or operated by a different source of heat such as charcoal or other fuel.

With these and other objects in view, my invention resides in the combinations, arrangements and functional relationships of elements as set forth in the following specification and particularly pointed out in the appended claims.

In the accompanying drawings,

Figure 1 is a perspective view of one form of barbecue stove embodying my invention;

Figure 2 is a vertical, longitudinal sectional view of the barbecue stove taken on the line 2—2 of Figure 1 and looking in the direction of the arrows;

Figure 3 is a horizontal sectional view taken on the line 3—3 of Figure 2 and looking in the direction of the arrows;

Figure 4 is a vertical, transverse sectional view taken on the line 4—4 of Figure 2 and looking in the direction of the arrows;

Figures 5 and 6 are enlarged fragmentary detail sectional views taken on the lines 5—5 and 6—6, respectively, of Figure 2, and looking in the directions of the respective arrows; and Figure 7 is a fragmentary vertical transverse sectional view similar to Figure 4 and illustrating the cooking chamber equipped to use charcoal or other solid fuel as the source of heat.

Referring specifically to the drawings, my invention in its illustrated embodiment is preferably constructed practically in its entirety of stainless steel and heat resistant glass, to provide a rectangular base frame B composed of four legs of L-shaped cross section at the corners of the frame and designated in pairs by 10 and 11, respectively, the legs being rigidly secured at their upper ends by bolts 12 to front and back panels 13 and 14, and end panels 15. In spaced relation to their lower ends the legs 10 and 11 are rigidly secured to a shallow tray 17 (Figure 1) which may be used as a support for any articles desired.

The pair of legs 10 are intended to rest directly on the ground or floor, whereas the legs 11, which are somewhat shorter than the legs 10, are spanned adjacent to their lower ends by an axle 20. On the outer projecting ends of the axle 20 are rotatably mounted, rubber tired wheels 21 on which the stove may be rolled about upon lifting the legs 10 clear of the ground by means of a handle bar 22 fixed at its ends to brackets 23 secured to the legs 10 by certain of the bolts 12.

Supported at a convenient height on the base frame B is a rectangular cooking chamber C comprising a flat bottom 25 welded or otherwise secured to the upper ends of the legs 10 and 11, and having relatively low front, back and end walls 26, 27 and 28, respectively, with the front wall 26 being provided with air inlet openings 29 and a removable container in the form of a sliding drawer at one end, designated at 30, in which drippings from meat being cooked may be collected for basting or other use as will later be fully described.

From the corners of the bottom 25 rise posts 35 of L-shaped cross section which are welded or otherwise rigidly secured to the walls 26, 27 and 28. The posts 35 at the front wall 26 are rigidly secured together adjacent to their upper ends by a member 36 having two downwardly opening guideways 37 and 38 which are vertically alined with two upwardly opening guideways 39, 40, respectively, rigidly secured to the upper edge of the front wall 26 as shown in Figure 4.

Doors 42 and 43 which are preferably of heat-resistant glass, are respectively slidable in the alined guideways 37, 39 and 38, 40, to close the front of the cooking chamber C, and are provided with finger-receiving recesses 44 for manipulation of the doors. The guideways 37, 38 are considerably deeper than the guideways 39, 40, and the doors 42, 43 are of sufficiently less height than the total distance between the bottoms of the upper and lower guideways for the doors to be removed therefrom by raising the doors into the upper guideways until the lower edges of the doors clear the lower guideways, and then swinging the doors outwardly.

The posts 35 are provided with vertical guideways 50 which slidably and removably receive panes 51, 52 and 53 of heat-resistant glass to close the back and ends of the cooking chamber. These panes rest upon the top edges of the walls 27 and 28, and the inner sides of the panes abut heat-sealing flanges 54 rising from such walls.

The rectangular top 60 of the cooking chamber C, which has the general shape of a low pitch hip roof, has a depending marginal flange 61 within which the upper ends of the posts 35 are snugly received so as to provide a friction fit of the top on the posts. The top 60 is provided with a lining of sheet asbestos 62 rigidly secured by screws 63 to cross bars 64 fixed in the top. Also secured to the cross bars 64 by the screws 63 is a supporting plate 65 for an electric heating element 66 which is covered by a protecting screen 67 secured to the depending marginal flange 68 of the plate.

The heating element 66 is connected to the terminals of a suitable electric socket 69 (Figure 2) recessed into the top 60. The top and the asbestos sheet 62 are provided with outlet ports 70 for co-action with the air inlet ports 29 in permitting a circulation of air through the cooking chamber C when the doors 42 and 43 are closed.

The food to be cooked may be supported by a grill designated generally at G and composed of two T-shaped end frames 71 and 72, the vertical members 73 and 74 of which are slidable vertically in suitable ways of guide brackets 75 and 76 welded or otherwise secured to the underside of the bottom 25 of the cooking chamber and projecting upwardly through openings in the bottom. Spanning the horizontal members 77 and 78 of the grill frames 71 and 72 at equally spaced intervals are food-supporting bars or rods 79 resting at their end portions in notches 80 and 81 in the respective members 77 and 78.

The rods 79 are held against upward displacement from the notches 80 of the frame member 77 by an overhanging retainer flange 82 of this frame, whereas the rods are held against upward displacement from the notches 81 of the frame member 78 by a locking member in the form of a rod 83 overlying the respective end of all the rods and slidably received in the openings of ears 84 projecting from the ends of the frame member 78. At one end the retainer rod 83 is bent laterally to provide a finger piece 85 by which the rod may be withdrawn from the ears 84 so as to permit the rods to be removed from the frames 71 and 72 for thorough cleaning individually.

Fixed to the vertical members 73 and 74 of the grill frames 71 and 72 are rack bars 90 which mesh with driving gears 91 fixed to a shaft 92 journaled in bearings 93 fixed to the bottom 25 underneath same. One end of the shaft 92 projects beyond the end of the cooking chamber C and is suitably bent to provide a crank handle 94 by which the shaft can be rotated for co-action of the gears 91 with the rack bars 90 in raising and lowering the grill G with respect to the heating element 66.

Suspended from the outermost rods 79 by hooks 95 is a drip pan 96 inclined downwardly to one corner in which is a drain pipe 97 disposed to discharge drippings from meat or other food being cooked, into the container 30. A suitable thermometer 98 (Figure 1) is easily readable from the front of the cooking chamber C and may be supported on the rods 79 of the grill G. Mounted in a slot 99 in the base frame B is a utility board 100 for use in the operation of the invention which is as follows:

With the doors 42 and 43 closed, the cooking chamber C is first heated by the heating element 66 until the thermometer 98 registers about 250 degrees Fahrenheit. The food to be cooked such as a piece of meat for example, is now placed on the grill G, which latter is then adjusted to dispose the meat about 5 to 6 inches from the heating element. The cooking rate is varied by raising or lowering the grill G while maintaining a temperature of from 250 to 275 degrees in the cooking chamber. When barbecuing, the doors 42 and 43 should be left open at least 3 to 4 inches from each end most of the time, and to accumulate more heat in the cooking chamber the doors may be closed for 2 to 3 minutes. When broiling steaks, the doors are left closed with the effect of making the steaks more juicy. The meat is basted by using the drippings in the container 30 over and over again, which procedure will leave meat or chicken a desirable reddish brown, juicy and tender.

To use charcoal or other fuel as the source of heat instead of the electric heating element 66, the drip pan 96 is removed from the grill G by releasing the hooks 95 from the rods 79, and two charcoal receptacles 102 (Figure 7) are placed on the bottom 25 of the cooking chamber C. Each of these receptacles is in the form of a relatively deep rectangular pan having feet 103 to raise the perforated bottom wall 104 of the pan clear of the bottom 25, and is provided on one side with a baffle or deflector 105, so that with the two receptacles installed as shown in this figure, the heat from the charcoal will be directed towards the center of the grill G on which the meat to be barbecued is placed. A drip pan 106 may be placed on the bottom 25 directly beneath the meat to catch the drippings, and the grill may be adjusted to bring the meat as close to the fire as required for best results. The doors 42 and 43 and the back pane 51 are removed when using the charcoal fire, and the stove is placed so that any wind or draft present will be free to blow through the open sides of the cooking chamber.

I claim:

1. In a barbecue stove, a grill comprising: two frames definitely spaced apart and having notches at intervals along their lengths; food-supporting rods spanning said frames and having their end portions seating in said notches and confined against axial displacement by the frames; one of said frames having fixed means to prevent lateral displacement of the respective end portion of the rods from such frame; and a removable locking member spanning the end portion of the rods at the other of said frames to lock the rods in the notches of said other frame.

2. In a barbecue stove, a grill comprising: two frame definitely spaced apart and having notches at intervals along their lengths; food-supporting rods spanning said frames and having their end portions seating in said notches and confined against axial displacement by the frames; one of said frames having fixed means to prevent lateral displacement of the respective end portion of the rods from the notches of such frame; the other of said frames having ears with openings therethrough; and a locking rod having a finger piece at one end and being removably fitted in said openings of said ears in spanning relation to the respective end portion of said food-supporting rods so as to lock the latter in the notches of said other frame.

3. In a barbecue stove, a grill comprising: frames definitely spaced apart and having notches at intervals along their lengths; food-supporting rods spanning said frames having their end portions seating in said notches and confined against axial displacement by portions of the frames; one of said frames having a flange overlying the respective end portion of the rods to prevent lateral displacement thereof from the notches of said one frame, yet permitting the other end of the rods to be laterally moved clear of the notches of the other frame for individual removal of the rods from the frames; and a locking member overlying the other end of the rods and being removably fitted in openings in said other frame to lock the rods in the notches of the other frame.

THOMAS J. SISTO.

REFERENCES CITED

The following references are of record in the file of this patent:

UNITED STATES PATENTS

| Number | Name | Date |
|---|---|---|
| 1,113,473 | Noreck | Oct. 13, 1914 |
| 1,226,771 | Hutchinson | May 22, 1917 |
| 1,853,319 | Polhemus | Apr. 12, 1932 |
| 1,883,946 | Kingsbaker | Oct. 25, 1932 |
| 1,934,125 | Hurt | Nov. 7, 1933 |
| 2,040,016 | Sanders | May 5, 1936 |
| 2,182,225 | Garvis | Dec. 5, 1939 |
| 2,227,608 | Tinnerman | Jan. 7, 1941 |
| 2,239,947 | Vanderveld | Apr. 29, 1941 |
| 2,309,784 | Peron | Feb. 2, 1943 |
| 2,330,132 | Martin et al. | Sept. 21, 1943 |
| 2,337,873 | Finizie | June 12, 1945 |
| 2,377,873 | Finizie | June 12, 1945 |
| 2,507,243 | Boyd et al. | May 9, 1950 |
| 2,510,856 | Bettencowrt | June 6, 1950 |